United States Patent [19]

McCready et al.

[11] Patent Number: 4,711,948

[45] Date of Patent: Dec. 8, 1987

[54] POLYETHERIMIDE ESTERS EXHIBITING IMPROVED TENSILE ELONGATION

[75] Inventors: Russell J. McCready; John A. Tyrell, both of Mt. Vernon, Ind.

[73] Assignee: General Electric Company, Pittsfield, Mass.

[21] Appl. No.: 913,395

[22] Filed: Sep. 30, 1986

[51] Int. Cl.$^4$ ...................... C08G 63/44; C08G 69/44
[52] U.S. Cl. .................... 528/288; 528/289; 528/291; 528/292; 528/296; 528/302; 528/303
[58] Field of Search ............... 528/288, 289, 291, 292, 528/296, 302–303

[56] References Cited

U.S. PATENT DOCUMENTS

| | | | |
|---|---|---|---|
| 4,121,266 | 10/1978 | Kovacs et al. | 528/288 |
| 4,429,072 | 1/1984 | Reiter et al. | 524/591 |
| 4,544,734 | 10/1985 | McCready | 528/288 |
| 4,556,705 | 12/1985 | McCready | 528/289 |
| 4,605,728 | 8/1986 | Tung | 528/289 |
| 4,661,582 | 4/1987 | McCready | 528/292 |

Primary Examiner—Lucille M. Phynes
Attorney, Agent, or Firm—William F. Mufatti

[57] ABSTRACT

Polyetherimide esters exhibiting improved tensile elongation comprised of the reaction products of (i) a diol mixture consisting essentially of butanediol and less than 70 mole percent of butenediol; (ii) at least one dicarboxylic acid or an ester forming reactive derivative thereof, and (iii) either at least one poly(oxy alkylene)diamine and at least one tricarboxylic acid or its derivative, or at least one polyoxyalkylene diimide diacid.

The instant polymers are suitable for extrusion and molding applications.

35 Claims, No Drawings

POLYETHERIMIDE ESTERS EXHIBITING IMPROVED TENSILE ELONGATION

BACKGROUND OF THE INVENTION

Polyetherimide esters comprised of the reaction products of (a) a diol, (b) a dicarboxylic acid, (c) a poly-(oxy alkylene)diamine, and (d) a tricarboxylic acid or its derivative are known and are described in U.S. Pat. Nos. 4,544,734 and 4,556,705 to McCready and in U.S. Pat. No. 4,556,688 to McCready et al. These polyetherimide esters exhibit excellent stress-strain properties, low tensile set, high melting temperatures and/or excellent strength/toughness characteristics as well as superior flexibility which are especially suitable for molding and extrusion applications.

It has now been discovered that by varying the diol reactant polyetherimide esters can be provided which exhibit high or improved tensile elongation. The polyetherimide esters exhibiting these high tensile elongation properties are obtained by utilizing as the diol reactant a mixture containing a butanediol and a butenediol.

SUMMARY OF THE INVENTION

In accordance with the instant invention there are provided poly(etherimide ester) elastomers exhibiting high tensile elongation properties. The polyetherimide esters of the instant invention are comprised of the reaction products of (a) a diol mixture containing a butanediol and less than 70 mole percent of a butenediol, (b) at least one dicarboxylic acid or an ester forming reactive derivative thereof, (c) at least one poly(oxy alkylene)-diamine, and (d) at least one tricarboxylic acid having two vicinal carboxyl groups or derivative thereof.

DESCRIPTION OF THE INVENTION

In accordance with the instant invention there are provided polyetherimide esters which exhibit high tensile elongation. The polyetherimide esters of the instant invention also exhibit high or improved melt strength. The instant polymers, while exhibiting these improved properties, also exhibit the advantageous properties exhibited by the polyetherimide esters generally.

The polyetherimide esters of the instant invention are comprised of the reaction products of:

(a) a diol component containing a mixture of butanediol and butenediol, the butenediol being present in said mixture in an amount less than 70 mole percent;

(b) at least one dicarboxylic acid or its ester forming reactive derivative;

(c) at least one high molecular weight poly (oxy alkylene)diamine; and (d) at least one tricarboxylic acid or a derivative thereof.

The diol component (a) contains a mixture of butenediol, preferably 2-butene-1,4-diol, and butanediol, preferably 1,4-butanediol. The amount of butenediol present in this mixture is an amount effective to improve the tensile elongation of the resultant polymer. This amount does not exceed, i.e., is less than, 70 mole percent, preferably less than about 65 mole percent, and more preferably less than about 60 mole percent. The minimum amount of butenediol present is generally about 5 mole percent, preferably about 10 mole percent, and more preferably about 15 mole percent. These amounts of butenediol are critical in providing polymers exhibiting high tensile elongation. Outside these concentrations of butenediol there is no appreciable improvement in tensile elongation over that exhibited by a polymer derived from 100 mole % butanediol. Mole percent butenediol is calculated based on the total moles of butenediol and butanediol present in the diol mixture.

It is critical that the diol component contain this mixture of butenediol and butanediol in order to provide a polymer exhibiting improved tensile elongation and melt strength. A polymer derived from either diol alone does not exhibit the increase in tensile elongation of the instant polymers.

The dicarboxylic acids (b) which are suitable for use in the practice of the present invention include the aliphatic, cycloaliphatic, and/or aromatic dicarboxylic acids. These acids are preferably of a low molecular weight, i.e., having a molecular weight of less than about 300, however, higher molecular weight dicarboxylic acids, especially dimer acids, may also be used. The term "dicarboxylic acids" as used herein includes the equivalents of dicarboxylic acids having two functional carboxyl groups which perform substantially like dicarboxylic acids in reactions with glycols and diols in forming polyester polymers. These equivalents include, for example, esters and ester-forming reactive derivatives such as, for example, the acid halides, e.g., diacid chlorides, and anhydrides. The molecular weight preference mentioned above pertains to the acid and not to its equivalent ester or ester-forming reactive derivative. Thus, an ester of a dicarboxylic acid having a molecular weight greater than 300 or an acid equivalent of a dicarboxylic acid having a molecular weight greater than 300 are included provided the acid has a molecular weight below about 300. Additionally, the dicarboxylic acids may contain any substituent group(s) or combinations which do not substantially interfere with the polymer formation and the use of the polymer of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a ring carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as $-O-$ or $-SO_2-$.

Representative aliphatic and cycloaliphatic acids which can be used for this invention include, for example, sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2-dicarboxylic acid, 2-ethylsuberic acid, tetramethylsuccinic acid, cyclopentanedicarboxylic acid, decahydro-1,5-naphthylene dicarboxylic acid, 4,4'-bicyclohexyl dicarboxylic acid, decahydro-2,6-naphthalene dicarboxylic acid, 4,4-methylenebis(cyclohexane carboxylic acid), 3,4-furan dicarboxylic acid, and 1,1-cyclobutanedicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$-$C_{12}$ alkyl, alkoxy, and aryl ring substitution derivatives thereof. Hydroxy acids such as p(betahydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 6–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (b) be of the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

The polyoxyalkylene diamines (c) suitable for use in the present invention may be characterized by the following general formula:

$$H_2N-G-NH_2 \qquad \text{I.}$$

wherein G is the radical remaining after the removal of the amino groups of a long chain alkylene ether diamine. These polyether diprimary diamines are available commercially from Texaco Chemical Company under the trademark Jeffamine. In general they are prepared by known processes for the amination of glycols. For example, they may be prepared by aminating the glycol in the presence of ammonia, Raney nickel catalyst and hydrogen as set forth In Belgium Pat. No. 634,741. Alternately, they may be prepared by treating the glycol with ammonia and hydrogen over a Nickel-Copper-Chromium catalyst as taught by U.S. Pat. No 3,654,370. Other methods for the production thereof include those taught in U.S. Pat. Nos. 3,155,728 and 3,236,895 and French Pat. Nos. 1,551,605 and 1,466,708, all of which are incorporated by reference.

The long chain ether diamines suitable for use herein are polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly (ethylene ether)diamine, poly(propylene ether) diamine, poly(tetramethylene ether)diamine random or block copolymers of ethylene oxide and propylene oxide including propylene oxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequent amination are useful. Especially preferred poly(alkylene ether)diamines are poly(propylene ether)diamine, poly(tetramethylene ether) diamine and poly(ethylene ether)glycols end-capped with poly(propylene ether)glycol and/or propylene oxide and subsequently aminated.

In general, the polyoxyalkylene daimines usefl within the scope of the present invention will have an average molecular weight of from about 600 to about 12,000, preferably from about 900 to about 4,000.

The tricarboxylic acid (d) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',4-benzophenone tricarboxylic anhydride, 1,3,4,-cyclopentane tricarboxylic anhydride, 2,2',3-diphenyl tricarboxylic anhydride, diphenyl sulfone-3,3',4-tricarboxylic anhydride, ethylene tricarboxylic anhydride, 1,2,5-naphthalene tricarboxylic anhydride, 1,2,4-butane tricarboxylic anhydride, 3,4-dicarboxyphenyl-3-carboxyphenyl ether anhydride, 1,3,4-cyclohexane tricarboxylic anhydride, and the like. These tricarboxylic acid materials may be characterized by the following general formula

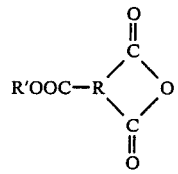

wherein:

R is a trivalent organic radical, preferably a trivalent $C_2$-$C_{20}$ alipahtic or cycloaliphatic or $C_6$-$C_{20}$ aromatic radical. Preferred trivalent radicals are the hydrocarbon radicals;

R' is preferably hydrogen or a monovalent organic radical preferably selected from $C_1$-$C_6$ aliphatic and/or cycloaliphatic radicals and $C_6$-$C_{12}$ aromatic radicals, e.g., benzyl, most preferably hydrogen.

The amount by which each of the foregoing reactants is employed in the preparation of the polymers of the present invention is not, in general, critical and depends, in part, upon the desired properties of the resultant polymer. Obviously, sufficient amounts of diol versus diacid and tricarboxylic acid versus diamine must be present, as recognized in the art, to allow for substantially complete polymerization.

This type of one-pot reaction involving the reactions of (a) a diol, (b) a dicarboxylic acid, (c) a poly(oxy alkylene)diamine, and (d) a tricarboxylic acid is described in U.S. Pat. No. 4,556,588 to McCready et al, incorporated by reference. In this type of one-pot reaction to produce the polyetherimide ester elastomer the amount of diol (a) employed will be, in general, a molar excess, preferably about 1.5 molar equivalents, based on the combined molar equivalents of dicarboxylic acid (b) and of the total moles of tricarboxylic acid (d). The amount of tricarboxylic acid (d) employed will preferably be about two molar equivalents based on the number of moles of the poly(oxy alkylene)diamine (c). Obviously, less than two molar equivalents would result incomplete imidization of the diamine resulting in potentially poorer properties. Conversely, greater than two molar equivalents of the tricarboxylic acid (d) may lead to cross-linking and/or branching of the polymer. Generally, mole ratios of 2 moles of tricarboxylic acid (d) to 0.85 to 1.15 mole of poly(oxy alkylene)diamine have been found to yield useful polymers. Finally, the amount by which the dicarboxylic acid (b) and the diamine (c) are used will be such that the weight ratio of the theoretical amount of polyoxyalkylene diimide diacid formable from the diamine (c) and tricarboxylic acid (d) to the dicarboxylic acid (b) will be from about 0.25 to about 2.0, preferably from about 0.4 to about 1.4.

The instant polyetherimide esters may also be prepared by a two-pot reaction involving the reactions of (a) a diol component, (b) a dicarboxylic acid, and (e) a polyoxyalkylene diimide diacid. Such a two-pot reaction is described in U.S. Pat. No. 4,556,705 to McCready, incorporated herein by reference. Basically, in this process the poly(oxy alkylene)diamine (c) is reacted with a tricarboxylic acid (d) to form a polyoxyalkylene diimide diacid (e), and said polyoxyalkylene diimide diacid is then reacted with the diol (a) and the dicarboxylic acid (b).

The polyoxyalkylene diimide diacid (e) may be represented by the general formula

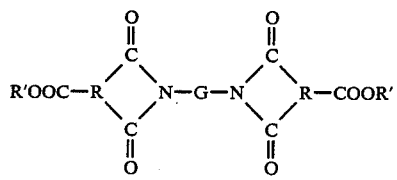

III.

wherein G, R and R' are as defined hereinafore.

The polyoxyalkylene diimide diiacids of Formula III suitable for use herein are high molecular weight diimide diacids wherein the average molecular weight is greater than about 700, most preferably greater than about 900. They may be prepared by the imidization reaction of one or more tricarboxylic acid components (d) containing two vicinal carboxyl groups or an anhydride group and an additional carboxyl group which must be esterifiable and preferably is nonimidizable with a high molecular weight poly(oxy alkylene)diamine (c). These polyoxyalkylene diimide diacids and processes for their preparation are disclosed in said U.S. Pat. No. 4,556,705, to McCready, incorporated herein by reference. Briefly, these polyalkylene diimide diacids may be prepared by known imidization reactions including melt synthesis or by synthesizing in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture.

In this two-pot process the weight ratio of the above ingredients, as in the one-pot process, is also not critical. However, it is preferred that the diol be present in at least a molar equivalent amount, preferably a molar excess, most preferably at least 150 mole % based on the moles of dicarboxylic acid (b) and polyoxyalkylene diimide diacid (e) combined. Such molar excess of diol will allow for optimal yields, based on the amount of acids, while accounting for the loss of diol during esterification/condensation.

Further, while the weight ratio of the dicarboxylic acid (b) to polyoxyalkylene diimide diacid (e) is not critical preferred compositions are those in which the weight ratio of the polyoxyalkylene diimide diacid (e) to dicarboxylic acid (b) is from about 0.25 to about 2, preferably from about 0.4 to about 1.4. The actual weight ratio will be dependent upon the specific polyoxyalkylene diimide diacid used and more importantly upon the desired physical and chemical properties of the resultant polyetherimide ester.

It is likewise possible, as described in U.S. Pat. No. 4,556,688, to prepolymerize the aromatic dicarboxylic acid (b) and the diol (a) to form a prepolyester. Forming the prepolyester of (a) and (b) can be achieved by conventional esterification techniques as described in U.S. Pat. Nos. 2,465,319, 3,047,439 and 2,910,466, all of which are incorporated herein by reference.

In its preferred embodiments, the compositions of the instant invention comprise the reaction products of dimethylterephthalate, optionally with up to 40 mole percent of another dicarboxylic acid; a mixture of butanediol, preferably 1,4-butanediol, and butenediol, preferably 2-butene-1,4-diol; and either (i) a poly(oxy alkylene) diamine of a molecular weight of from about 600 to about 12,000, preferably from about 900 to about 4,000, and trimellitic anhydride, or (ii) a polyoxyalkylene diimide diacid prepared from a poly(oxy alkylene)-diamine of molecular weight of from about 600 to about 12,000, preferably from about 900 to about 4,000, and trimellitic anhydride. In its more preferred embodiment the diol mixture will contain from about 05 to below 70 mole percent butenediol and the dicarboxylic acid will be 100 mole percent dimethylterephthalate.

The instant polyetherimide esters may be prepared by conventional esterification/condensation reactions for the production of polyesters. These processes are described, inter alia, in U.S. Pat. Nos. 3,763,109, 3,651,014 and 3,801,547, all of which are incorporated herein by reference, and in U.S. Pat. Nos. 4,556,705 and 4,556,688, also incorporated herein by reference.

The polyetherimide esters of the instant invention contain at least the following two general recurring structural units:

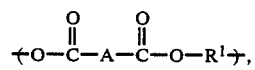

IV.

and

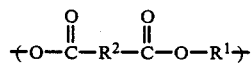

V.

wherein:

A is the residue of the polyoxyalkylene diimide diacid absent the two carboxyl groups, e.g.,

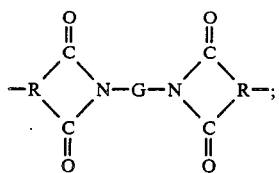

R¹ is the residue of the diol absent the two hydroxyl groups; and

R² is the residue of the dicarboxylic acid absent the two carboxyl groups.

Since, in the practice of the instant invention, the diol used is a mixture of butanediol and butenediol IV and V will, in general, be comprised of two sub-formulae, i.e., one wherein R¹ is the residue of butanediol and one wherein R¹ is the residue of butenediol. Thus, the polyetherimide esters of the instant invention generally contain at least the following four recurring structural units:

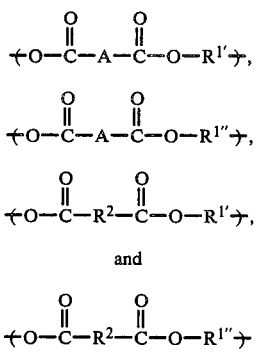

wherein:

A and R² are as defined hereinafore;

R¹' is the residue of the butanediol absent the two hydroxyl groups, e.g., butylene radical; and R¹" is the residue of the butenediol absent the two hydroxyl groups, e.g., butenylene radical.

Since, in the instant invention, the amount of butenediol present in the diol mixture is from about 5 to below 70 mole percent, and since the amounts of units of Formulae IVb and Vb are generally related to and dependent upon the amount of butenediol present in the reaction mixture, the combined or total amounts of units IVb and Vb (IVb+Vb) present is from about 5 to below 70 mole percent. Conversely, since the amount of the butanediol present in the diol mixture is from above 30 to about 95 mole percent, and since the amounts of recurring structural units IVa and Va (IVa+Va) present is generally related to and dependent upon the amount of butanediol present in the reaction mixture, the instant polyetherimide ester will generally contain from above 30 to about 95 mole percent of units IVa and Va. Amounts of units IVb and Vb present are calculated based on the total amounts, in moles, of units IVa, IVb, Va and Vb present.

It is to be understood that under certain circumstances, particularly when utilizing processes other than the one-pot process described hereinafore, polyetherimide esters of the instant invention can be produced which are comprised of less than all four of the recurring structural units IVa-Vb, but in no case containing less than two recurring structural units of either Formulae IVa and Vb or Formulae IVb and Va. Thus, for example, if a polyalkylene etherdiimide ester, i.e., IV, is first prepolymerized separately (by the reaction of the diol, poly(oxy alkylene)diamine, and the tricarboxylic acid, or by the reaction of the diimide diacid and the diol) utilizing only one diol of the diol mixture, e.g. butenediol, and the polyester, i.e., V, is then polymerized utilizing the diol mixture of butenediol and butanediol, then the polyetherimide ester of the instant invention will comprise the three recurring structural units IVb, Va and Vb. Conversely, if the polyester, i.e., V, is first prepolymerized separately (by the reacttion of the dicarboxylic acid with the diol) using only one diol of the diol mixture, e.g., butenediol, and the polyalkylene etherdiimide ester, i.e., IV, is then polymerized utilizing the diol mixture of butanediol and butenediol, then the polyetherimide ester polymer of the instant invention will contain the three recurring structural units IVa, IVb and Vb.

In the process of the present invention for the preparation of the polyetherimide ester polymers, particularly where all the reactants are charged to the reactor together or where the polyoxyalkylene diimide diacid is preformed and excess tricarboxylic acid is present, a minor amount of the tricarboxylic acid or anhydride may react with the available hydroxyl groups and ultimately function as a branching agent in the finished polymer. Within limits, the degree of branching in the finished polymer can be controlled by varying the mole ratio of tricarboxylic acid (d) to polyoxyalkylene diamine (c). An excess of diamine reduces the degree of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching it should be noted that polymers of this invnetion, when prepared from preformed diimide-diacids, are substantially free of branching. If branching is desired, one needs only to introduce a branching agent such as trimellitic anhydride alomg with the preformed diimidediacid The amount of branching agent generally will be less than 0.15 mole per mole of diimidediacid or ester thereof. Useful branching agents other than trimellitic anhydride include, but are not limited to, trimethyl trimellitate, glycerol, trimethylol propane, trimesic acid and its esters, and the like.

Additionally, while not required, it is customary and preferred to utilize a catalyst or catalyst system in the process for the production of the polyether imide esters of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony tri-oxide and the like. These catalysts, as well as additional useful catalysts are described in U.S. Pat. Nos. 2,465,319, 2,534,028, 2,850,483, 2,892,815, 2,937,160, 2,998,412, 3,047,549, 3,110,693 and 3,385,830, among other, incorporated herein by reference.

Where the reactants and reactions allow it is preferred to use the titanium catalysts including the inorganic and organic titanium containing catalysts, such as those described, for example, in U.S. Pat. Nos. 2,720,502, 2,727,881, 2,729,619, 2,822,348, 2,906,737, 3,047,515, 3,056,817, 3,056,818 and 3,075,952, all of which are incorporated herein by reference. Especially preferred are the organic titanates such as tetra-butyl titanate, tetra-isopropyl titanate, and tetra-octyl titanate and the complex titanates derived from alkali or alkaline earth metal alkoxides and titanate esters, most preferably organic titanates. These too may be used alone or in combination with other catalysts such as for example, zinc acetate, calcium acetate, magnesium acetate or antimony trioxide, and/or with a catalyst quencher as described. The catalyst should be used in catalytic amounts, i.e., from about 0.005 to about 2.0 percent by weight based on total reactants.

Both batch and continous methods can be used for any stage of the ether imide ester polymer preparation. Polycondensation of the polyester prepolymer with the poly(oxy alkylene) diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyetherimide esters of this invention possess good resistance toward heat aging and photodegradation, it is advisable to stabilize these compounds by the addition of a antioxidant.

Many of the oxidative and/or thermal stabilizers known in the art for copolyesters may be used in the practice of the present invention. These may be incorporated into the composition either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state. Some specific examples of these stabilizers are described in U.S. Pat. No. 4,556,688, incorporated herein by reference.

The instant compositions can be stabilized against ultraviolet radiation by the addition thereto of the well known ultraviolet radiation absorbers such as, for example, the substituted benzophenones and benzotriazoles.

Further, the properties of these polymers can be modified by incorporation of various conventional and well known inorganic fillers such as carbon black, silica gel, alumina, clays, and chopped fiberglass. These may be incorporated in amounts up to 50% by weight, preferably up to about 30% by weight.

The polymers of the instant invention may also optionally contain the various well known flame retardants such as, for example, the halogen and/or sulfur containing organic and inorganic compounds.

DESCRIPTION OF THE PREFERRED EMBODIMENT

The following examples are presented to more fully illustrate the present invention. They are presented as illustrative of the present invention and are not to be construed as limiting thereof. In the examples all parts and percentages are parts and percentages by weight unless otherwise specified.

The following examples illustrate compositions falling outside the scope of the instant invention. They are presented for comparative purposes only.

EXAMPLE 1

This examples illustrates a polyetherimide ester derived from 100 mole percent 1,4-butanediol as the diol reactant.

To a reactor vessel there are charged 4767 parts by weight of 1,4-butanediol, 4320 parts by weight of polyoxyalkylene diimide diacid (prepared by the imidization of trimellitic anhydride with Texaco Chemical Company's Jeffamine ® D2000, a polypropylene ether diamine average molecular weight 2,000), 6129 parts by weight of dimethyl terephthalate, a phenolic stabilizer, and a titanate catalyst. The reactor is heated at 160° C. whereupon methanol was generated. The methanol is distilled and the temperature is gradually raised to 240° C. After heating at this temperature for over an hour vacuum is applied and the polymer is removed.

The following properties of the polymer are determined, and the results are set forth in Table I:

melt viscosity (MV) in poise determined in accordance with modified test method ASTM D1238;

% tensile elongation determined in accordance with test method ASTM D638;

flexural modulus, $psi \times 10^3$, in accordance with test method ASTM D790;

tensile strength, at break and at yield, in accordance with test method ASTM D790; and flexural strength in accordance with test method ASTM D790.

EXAMPLE 2

This example illustrates a polyetherimide ester derived from a diol component containing 100 mole percent butenediol.

The procedure of Example 1 is substantially repeated except that into the reactor are charged 209 parts by weight of butenediol, 189 parts by weight of polyoxyalkylene diimide diacid of the type used in Example 1, and 270 parts by weight of dimethyl terephthalate.

The properties of the resultant polymer are determined and the results are set forth in Table I.

EXAMPLE 3

This example illustrates a polyetherimide ester derived from a diol component containing 90 mole percent butenediol and 10 mole percent butanediol.

The procedure of Example 2 is substantially repeated except into the reactor are charged 188 parts by weight of butenediol and 21 parts by weight of butanediol.

The properties of the resultant polymer are determined and the results are set forth in Table I.

The properties of the resultant polymer are determined and the results are set forth in Table I.

TABLE I

| Example No. | mole % butenediol* | mole % butanediol** | melt viscosity | % tensile elongation | flexural modulus | flexural strength | tensile strength at yield | tensile strength at break |
|---|---|---|---|---|---|---|---|---|
| 1 | 0 | 100 | 2900 | 160 | 24,000 | 1500 | 2400 | 3200 |
| 2 | 100 | 0 | 3870 | 90 | 29,000 | 1700 | 2200 | 2200 |
| 3 | 90 | 10 | — | 95 | 19,000 | 1300 | 2000 | 2400 |
| 4 | 70 | 30 | — | 160 | 14,000 | 700 | 1500 | 2200 |
| 5 | 25 | 75 | 1350 | 270 | 23,000 | 1350 | 1800 | 2900 |
| 6 | 50 | 50 | 2150 | 240 | 19,000 | 1090 | 1500 | 2700 |
| 7 | 50 | 50 | — | 260 | 41,000 | 2500 | 2600 | 3200 |

*2-butene-1,4-diol
**1,4-butanediol

EXAMPLE 4

This example illustrates a polyetherimide ester derived from a diol component containing 70 mole percent butenediol and 30 mole percent butanediol.

The procedure of Example 2 is substantially repeated except that into the reactor are charged 146 parts by weight of butenediol and 63 parts by weight of butanediol.

The properties of the resultant polymer are determined and the results are set forth in Table I.

The following examples illustrate compositions falling within the scope of the instant invention.

EXAMPLE 5

This example illustrates a polyetherimide ester derived from a diol component containing 25 mole percent butenediol and 75 mole percent butanediol.

The procedure of Example 2 is substantially repeated except that into the reactor are charged 50 parts by weight of butenediol and 150 parts by weight of butanediol.

The properties of the resultant polymer are determined and the results are set forth in Table I.

EXAMPLE 6

This example illustrates a polyetherimide ester derived from a diol component containing 50 mole percent butenediol and 50 mole percent butanediol.

The procedure of Example 2 is substantially repeated except into the reactor are charged 105 parts by weight of butenediol and 105 parts by weight of butanediol.

The properties of the resultant polymer are determined and the results are set forth in Table I.

EXAMPLE 7

This example illustrates a polyetherimide ester derived from a diol component containing 50 mole percent butenediol and 50 mole percent butanediol. However, in contradistinction to the compositions of Examples 1–6 where the mole ratio of dimethyl terephthalate to polyoxyalkylene diimide diacid was the same, the amount of dimethyl terephthalate is increased relative to that of the polyoxyalkylene diimide diacid over that used in Examples 1–6.

The procedure of Example 1 is substantially repeated except that into the reactor vessel are charged 126 parts by weight of butenediol, 126 parts by weight of butanediol, 324 parts by weight if dimethyl terephthalate, and 113 parts by weight of polyoxyalkylene diimide diacid of the type used in Example 1.

As illustrated by the data in Table I the polymers of the instant invention (Examples 5–7) exhibit higher or better tensile elongation than polymers derived from either 100 mole percent butanediol or 100 mole percent butenediol, Examples 1 and 2 respectively. That the addition of butenediol to butanediol would be effective in improving the tensile elongation of a polymer derived from such a diol mixture is surprising and unexpected since a polymer derived from butenediol has a lower tensile elongation value than a polymer derived from butanediol. Yet the polymers of the instant invention exhibit higher tensile elongation than polymers derived from 100 mole % butanediol.

Likewise, polymers derived from a mixture of butenediol and butanediol have lower melt viscosities than a polymer derived from butanediol. Since a polymer derived from butenediol has a higher melt viscosity than a polymer derived from butanediol it is indeed unexpected and surprising that adding a butenediol to butanediol would yield a polymer having a lower melt viscosity than a polymer derived from butanediol alone.

That not just any ratio of butanediol to butenediol is effective in improving the tensile elongation of polyetherimide esters is illustrated by the data of Examples 3 and 4. In order to obtain a polymer having a tensile elongation greater than that of a polymer derived from 100 mole % butanediol it is necessary that the amount of butenediol present in the diol mixture is below 70 mole %.

Example 7 illustrates that the improvement in tensile elongation of the polyetherimide esters is exhibited by polyetherimide esters derived from wide ratios of dicarboxylic acid to polyoxyalkylene diimide diacid.

Obviously other modifications and variations of the present invention are possible in light of the above teachings. It is, therefor, to be understood that changes may be made in the particular embodiments of the invention described which are within the full intended scope as defined by the appended claims.

What is claimed is:

1. A polyetherimide ester composition comprising the reaction products of:
   (i) a mixture of butanediol and butenediol wherein the amount of butenediol present in said mixture is less than 70 mole percent;
   (ii) at least one dicarboxylic acid or an ester forming reactive derivative thereof; and
   (iii) a set of reactants selected from
      (a) (i) at least one high molecular weight poly(oxyalkylene)diamine, and (ii) at least one tricarboxylic acid or a derivative thereof, or
      (b) at least one polyoxyalkylene diimide diacid.

2. The composition of claim 1 wherein said diol mixture contains less than about 65 mole percent of butenediol.

3. The composition of claim 2 wherein said diol mixture contains less than about 60 mole percent of butenediol.

4. The composition of claim 1 wherein said butenediol is 2-butene-1,4-diol.

5. The composition of claim 1 wherein said butanediol is 1,4-butanediol.

6. The composition of claim 1 wherein said dicarboxylic acid (ii) is selected from $C_2$-$C_{16}$ alipahtic or cycloaliphatic dicarboxylic acids, $C_6$ to $C_{16}$ aromatic dicarboxylic acids, ester equivalents of said aliphatic, cycloaliphatic, or aromatic acids, or mixtures thereof.

7. The composition of claim 6 wherein said dicarboxylic acid (ii) is from about 60 to 100 mole percent dimethyl terephthalate.

8. The composition of claim 7 wherein said dicarboxylic acid (ii) is from about 80 to about 100 mole percent dimethyl terephthalate.

9. The composition of claim 8 whereins said dicarboxylic acid (ii) is 100 mole percent dimethyl terephthalate.

10. The composition of claim 1 wherein (iii) is at least one high molecular weight poly(oxy alkylene diamine), and at least one tricarboxylic acid or derivative thereof.

11. The composition of claim 10 wherein said poly(oxy alkylene)diamine is represented by the formula $$H_2N-G-NH_2$$

wherein G is the radical remaining after the removal of amino groups of a long chain alkylene ether diamine and the poly(oxy alkylene)diamine has an average molecular weight of from about 600 to about 12,000.

12. The composition of claim 11 wherein the average molecular weight of said poly(oxy alkylene) diamine is from about 900 to about 4,000.

13. The composition of claim 11 wherein the poly(oxyalkylene)diamine is derived from a long chain ether glycol selected from poly(ethylene ether)glycol, poly(propylene ether)glycol, poly(tetramethylene ether) glycol, copoly(propylene ether-ethylene ether)glycol, or mixtures thereof.

14. The composition of claim 13 wherein said long chain ether glycol is poly(propylene ether) glycol.

15. The composition of claim 10 wherein said tricarboxylic acid is represented by the formula

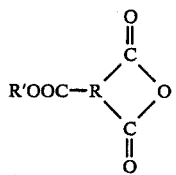

wherein R is a $C_2$ to $C_{20}$ trivalent aliphatic or cycloaliphatic radical, or a trivalent $C_6$ to $C_{20}$ aromatic radical, and R' is hydrogen or a $C_1$ to $C_6$ aliphatic radical.

16. The composition of claim 15 wherein said tricarboxylic acid is trimellitic anhydride.

17. The composition of claim 10 wherein the weight ratio of the theoretical amount of polyoxyalkylene diimide diacid formable from the diamine (iii)(a)(i) and tricarboxylic acid (iii)(a)(ii) to the amount of dicarboxylic acid (ii) is from about 0.25 to about 2.0.

18. The composition of claim 17 wherein said weight ratio of said polyoxyalkylene diimide diacid to said dicarboxylic acid is from about 0.4 to about 1.4.

19. The composition of claim 1 wherein (iii) is at least one polyoxyalkylene diimide diacid (b).

20. The composition of claim 19 wherein said polyoxyalkylene diimide diacid is derived from at least one poly(oxy alkylene)diamine and at least one tricarboxylic acid containing two vicinal carboxyl groups or an anhydride groups and an additional carboxyl group.

21. The composition of claim 20 wherein said polyoxyalkylene diimide diacid is represented by the formula

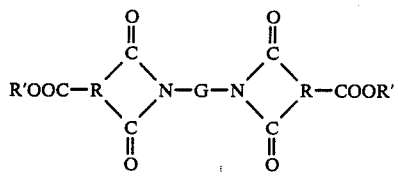

wherein each R is independently selected from $C_2$ to $C_{20}$ aliphatic or cycloaliphatic trivalent organic radicals, or $C_6$ to $C_{20}$ aromatic trivalent organic radicals; each R' is independently selected from hydrogen, $C_1$ to $C_6$ aliphatic or cycloaliphatic monovalent organic radicals, or $C_6$-$C_{12}$ aromatic monovalent organic radicals; and G is the divalent radical remaining after removal of the two amino groups of a long chain ether diamine having an average molecular weight of from about 600 to about 12,000.

22. The composition of claim 21 wherein the polyoxyalkylene diimide diacid is such that each R is a $C_6$ trivalent aromatic hydrocarbon radical, each R' is hydrogen, and G is the radical remaining after removal of the amino groups of a long chain ether diamine having an average molecular weight of from about 900 to about 4,000.

23. The composition of claim 21 wherein said polyoxyalkylene diimide diacid is derived from trimellitic anhydride and a poly(oxy alkylene)diamine selected from poly(oxy propylene)diamine and a copoly(ethylene oxide-propylene oxide)diamine having predominately polethylene oxide in the backbone.

24. The composition of claim 19 wherein the weight ratio of said polyoxyalkylene diimide diacid to said dicarboxylic acid (ii) is from about 0.25 to about 2.0

25. The composition of claim 24 wherein said weight ration of said polyoxyalkylene diimide diacid to said dicarboxylic acid (ii) is from about 0.4 to about 1.4.

26. A polyetherimide ester polymer comprised of at least the following two recurring strutural units:

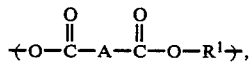

and

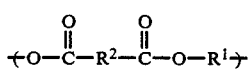

wherein:
$R^1$ is independently selected from a mixture of the residues of butanediol and butenediol absent the two hydroxyl groups, said mixture containing less than 70 mole percent of the residue of butenediol;

A is the residue of a high molecular weight polyoxyalkylene diimide diacid absent the two carboxyl groups; and $R^2$ is the residue of a dicarboxylic acid absent the two carboxyl groups.

27. The polymer of claim 26 wherein A is represented by the formula

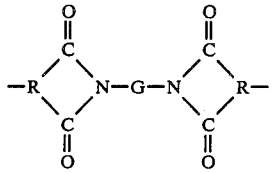

wherein:
- each R is independently selected from trivalent organic radicals selected from $C_2$–$C_{20}$ aliphatic or cycloaliphatic or $C_6$–$C_{20}$ aromatic trivalent organic radicals; and
- G is the divalent radical remaining after removal of the amino groups of a long chain poly(oxy alkylene) diamine having an average molecular weight of from about 600 to about 12,000.

28. The polymer of claim 26 wherein $R^2$ is the divalent residue of a $C_2$–$C_{16}$ aliphatic or cycloaliphatic dicarboxylic acid or a $C_6$–$C_{16}$ aromatic dicarboxylic acid.

29. The polymer of claim 28 wherein $R^2$ is the residue of an aromatic dicarboxylic acid.

30. The polymer of claim 27 wherein said polymer is comprised of at least the following recurring structural units:

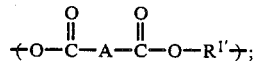 (a)

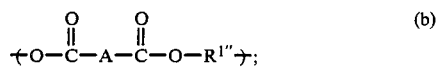 (b)

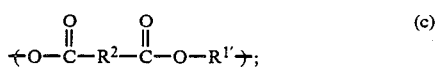 (c)

and

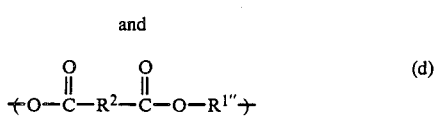 (d)

wherein:
$R^{1'}$ is the residue of butanediol absent the two hydroxyl groups, and
$R^{1''}$ is the residue of butenediol absent the two hydroxyl groups,
said polymer containing a combined amount of recurring structural units (b) and (d) which is less than 70 mole percent, based on the total amounts of units (a), (b), (c) and (d) present.

31. The polymer of claim 30 wherein $R^2$ is the divalent residue absent the two carboxylic groups of a $C_2$–$C_{16}$ alipahtic or cycloaliphatic or $C_6$–$C_{16}$ aromatic dicarboxylic acid.

32. The polymer of claim 30 wherein G is the divalent radical remaining after removal of the amino groups of a long chain poly(oxy alkylene)diamine having an average molecular weight of from about 900 to about 4,000.

33. The polymer of claim 32 wherein said $R^2$ is the residue of dimethyl terephthalate.

34. The polymer of claim 30 wherein the combined amount of units (b) and (d) is less than about 65 mole percent.

35. The polymer of claim 34 wherein the combined amount of units (b) and (d) is less than about 60 mole percent.

* * * * *